(No Model.)

B. V. CRUMRINE.
AUTOMATIC WIND DEFLECTOR.

No. 504,563. Patented Sept. 5, 1893.

Benton V. Crumrine
Inventor

Witnesses by
Attorney

UNITED STATES PATENT OFFICE.

BENTON V. CRUMRINE, OF CORNING, CALIFORNIA.

AUTOMATIC WIND-DEFLECTOR.

SPECIFICATION forming part of Letters Patent No. 504,563, dated September 5, 1893.

Application filed October 12, 1892. Serial No. 448,714. (No model.)

*To all whom it may concern:*

Be it known that I, BENTON V. CRUMRINE, of Corning township, county of Tehama, State of California, have invented an improved automatic wind-deflector to be used for concentrating the wind blast from the fan of a machine for separating grain from its chaff to either side of the sieve in an oblique direction, of which the following is a specification.

This invention relates to improvements in automatic wind deflectors for grain separating machines; and it consists in providing deflectors between the mouth or outlet and the fan which are pivotally supported and connected to each other by a rod, said rod being suitably hung and provided with a weight, whereby, when the machine is not on a level, the deflectors will be adjusted to direct the air blast toward the lowest part of the separator, so that it will operate effectively upon the lower portion of the screens or sieves where the greatest amount of grain will naturally accumulate.

Figure 1:
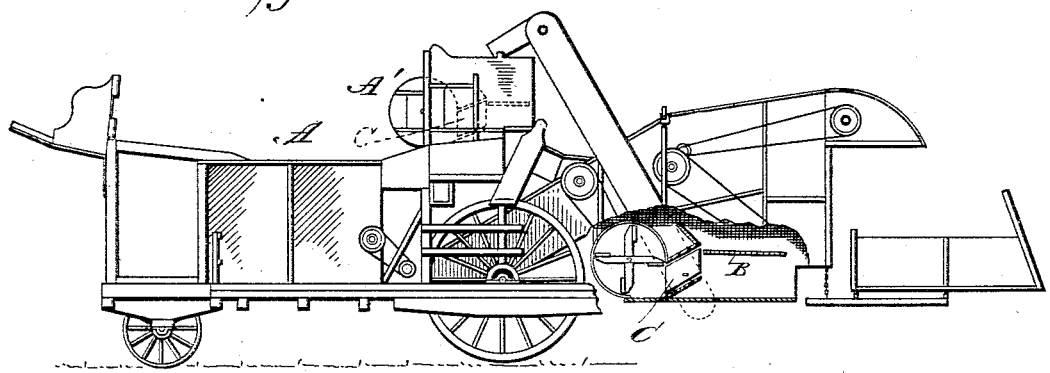
Figure 2:
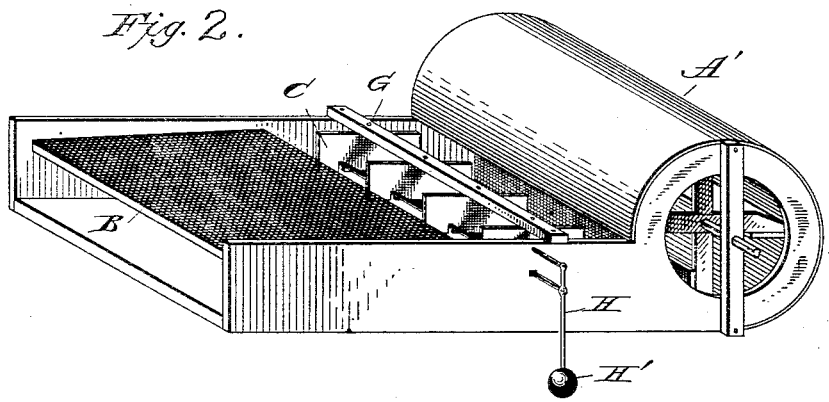
Figure 3:
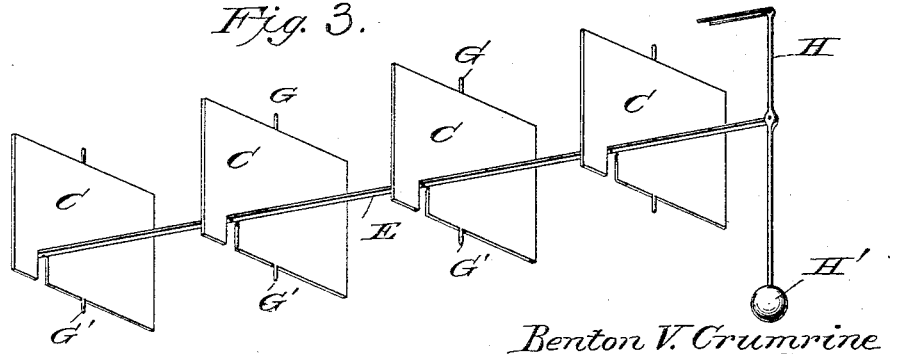

In the accompanying drawings, forming part of this specification, Figure 1 is a view showing the application of my improvement to a grain harvester and thrashing machine. Fig. 2 is a detail perspective view, and Fig. 3 is a detail perspective view of the deflectors and their operating parts detached.

A designates the combined harvester and thrashing machine, which is provided with grain separating mechanism of ordinary construction, comprising in part a sieve, or series of sieves, B, and a fan, A', the outlet or mouth of the fan casing directing the blast either under or above the sieves. Between the sieves and fan are located deflectors C, which consist of plates or blades having pivots G and G' which bear in perforations in strips secured between the side pieces of the thrashing machine, or the boards forming the mouth of the fan casing may provide bearings for the deflectors. The deflectors are each provided with an aperture near one end, and through these apertures passes a rod E which connects the deflectors to each other, one end of said rod extending beyond the casing to engage with a suspended arm or lever H which is operated to change the position of the deflectors by means of a weight H', said weight being attached to the lower end of the lever so as to move the same by gravity. The rod E is connected to the deflectors in any suitable manner. The plates or deflectors may be of any suitable shape, and are adapted to be turned by the movement imparted to them by the rod E. The shape of the deflectors are determined, mainly, by the configuration of the blast spout of the grain separating apparatus.

This device is adapted to be applied to portable thrashing or grain separating machines, or to that class of machines known as harvesters, which have mechanism which cuts and thrashes the grain, and it is obvious that on many occasions the apparatus will be inclined, and in such instances the grain and chaff which falls upon the sieves will go to the lower portion of the sieves and the draft not being increased will render the operation of the grain separating mechanism ineffective, as the blast is equally distributed over or under the sieves. With my improvement should the grain separating machine be inclined the deflectors will be shifted automatically to direct the blast from the fan to the part of the sieves where the greatest amount of grain and chaff will accumulate, as the weighted arm or lever H will at all times assume a vertical position irrespective of the inclination of the machine to which it is pivoted, and the deflectors being connected to this arm or lever will be moved therewith. The bulk of the weight on the lever is such that the position of the deflectors will not be affected by the blast from the fan. When the machine is level the deflectors will not interfere with the direction of the blast from the fan.

Having thus described my invention, what I claim as new, and desire to secure by Letters Patent, is—

1. In combination with a grain separating machine comprising in part a fan and sieves, a deflector interposed between the fan and sieve, said deflector being adapted to be moved by gravity so as to direct the blast from the fan toward the lower portion of the sieves.

2. In combination with a grain separating machine comprising in part a fan the casing of which is provided with a mouth or outlet which leads to the sieves or separating mechanism, a plurality of deflectors pivoted in the space between the fan and sieves or separating mechanism and connected to each other so as to move in unison, said deflectors being shifted when the separating machine is inclined, for the purpose set forth.

3. In combination with a grain separating machine comprising in part a fan or blast mechanism and separating mechanism, a series of deflectors pivoted between the separating mechanism and blast mechanism, said deflectors being connected to each other and with a bar having a weighted end, for the purpose set forth.

4. In a grain separating machine, a series of deflectors maintained in a vertical position adjacent to the sieves and in the path of the blast, said deflectors being connected to each other and to means for automatically swinging them upon their pivots when the grain separating mechanism or sieves are inclined, for the purpose set forth.

5. In a grain separating machine, the combination, of a fan and fan casing, a throat or passageway leading therefrom to the part of the separator containing the sieves, of a series of deflectors pivoted in the blast passage and having portions which extend on each side of the pivots, a rod connected to said deflectors to one side of the pivots, said rod being connected to a swinging arm or lever carrying a weight, substantially as shown, whereby the deflectors will be automatically moved to direct the blast toward that part of the grain separating mechanism which may be the lowest and automatically return the deflectors to a position on a line with the direction of the blast when the separating mechanism assumes a horizontal position, substantially as specified.

BENTON V. CRUMRINE.

Witnesses:
RICHARD GERNON,
ALEXANDER M. MCCOY.